(12) United States Patent
Guy et al.

(10) Patent No.: US 9,471,272 B2
(45) Date of Patent: Oct. 18, 2016

(54) SKIP OF A PORTION OF AUDIO

(71) Applicant: Lenovo (Singapore) Pte. Ltd., New Tech Park (SG)

(72) Inventors: Spencer Michael Guy, Raleigh, NC (US); Russell Speight VanBlon, Raleigh, NC (US); Jason Grimme, Cary, NC (US); Kyle Jared McDaniel, Morrisville, NC (US); Dharma Teja Nukarapu, Morrisville, NC (US)

(73) Assignee: LENOVO (Singapore) PTE. LTD., New Tech Park (SG)

( * ) Notice: Subject to any disclaimer, the term of this patent is extended or adjusted under 35 U.S.C. 154(b) by 0 days.

(21) Appl. No.: 14/606,314

(22) Filed: Jan. 27, 2015

(65) Prior Publication Data

US 2016/0216934 A1  Jul. 28, 2016

(51) Int. Cl.
*G06F 17/00* (2006.01)
*G06F 3/16* (2006.01)

(52) U.S. Cl.
CPC .............. *G06F 3/165* (2013.01); *G06F 3/162* (2013.01)

(58) Field of Classification Search
CPC .......... G06F 17/3053; G06F 17/3054; G06F 17/30749; G06F 17/30761; G06F 17/30772; G06F 3/165; G06F 3/167
See application file for complete search history.

(56) References Cited

U.S. PATENT DOCUMENTS

| | | | |
|---|---|---|---|
| 2004/0001161 A1* | 1/2004 | Herley | H04H 60/56 348/465 |
| 2009/0313564 A1* | 12/2009 | Rottler | G11B 27/105 715/764 |
| 2014/0114966 A1* | 4/2014 | Bilinski | G06F 17/30749 707/723 |

* cited by examiner

*Primary Examiner* — Andrew C Flanders
(74) *Attorney, Agent, or Firm* — John L. Rogitz; John M. Rogitz

(57) ABSTRACT

In one aspect, a device includes a processor and a memory accessible to the processor. The memory bears instructions executable by the processor to determine that a portion of audio has been skipped a threshold number of times, and in response to the determination that the portion of the audio has been skipped the threshold number of times, skip the portion without input from a user to skip the portion upon a subsequent presentation of the audio.

20 Claims, 7 Drawing Sheets

SKIP OF A PORTION OF AUDIO

FIELD

The present application relates generally to skipping a portion of audio presented on a device.

BACKGROUND

Often, songs contain a portion which a user does not desire to listen to repeatedly, even if the user wishes to listen to another portion of the song repeatedly. For instance, a song may have an introduction in which the artist that wrote the song is talking, and the user may not wish to listen to the introduction every time the user listens to the song. However, manually skipping the introduction every time the user listens to the song can be burdensome, and even dangerous if the user is e.g. driving while trying to manipulate their device to skip the portion.

SUMMARY

Accordingly, in one aspect a device includes a processor and a memory accessible to the processor. The memory bears instructions executable by the processor to determine that a portion of audio has been skipped a threshold number of times, and in response to the determination that the portion of the audio has been skipped the threshold number of times, skip the portion without input from a user to skip the portion upon, a subsequent presentation of the audio.

In another aspect, a method includes determining that a portion of a media file has been skipped a threshold number of times upon respective playbacks of the media file and, in response to determining that the portion of the media file has been skipped the threshold number of times, skipping playback of the portion upon a subsequent playback of the media file.

In still another aspect, an apparatus includes a first processor a network adapter, and storage bearing instructions executable by a second processor for determining that a portion of an audio life has been skipped a threshold number of times during respective playbacks of the audio file and, in response to the determination that the portion of the audio file has been skipped the threshold number of times, skipping playback of the portion during a subsequent playback of the audio file. The first processor transfers the instructions over a network via the network adapter.

The details of present principles, both as to their structure and operation, can best be understood in reference to the accompanying drawings, in which like reference numerals refer to like parts, and in which:

DETAILED DESCRIPTION

Figure 1:
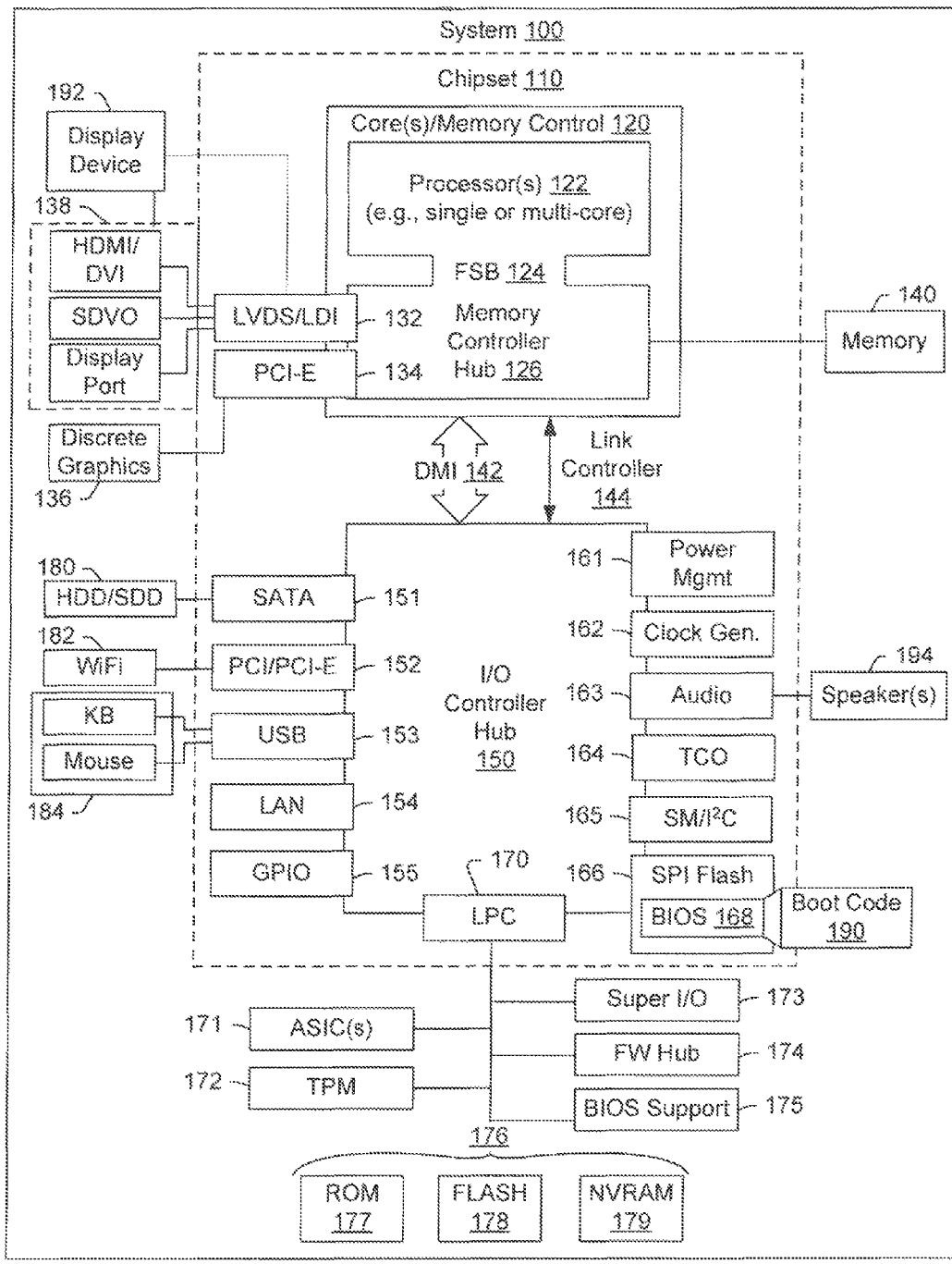
FIG. 1 is a block diagram of an example system in accordance with present principles.

This disclosure relates generally to device-based information. With respect to any computer systems discussed herein, a system may include server and client components, connected over a network such that data may be exchanged between the client and server components. The client components may include one or more computing devices including televisions (e.g. smart TVs, Internet enabled TVs), computers such as desktops, laptops and tablet computers, so-called convertible devices (e.g. having a tablet configuration and laptop configuration), and other mobile devices including smart phones. These client devices may employ, as non-limiting examples, operating systems from Apple, Google, or Microsoft. A Unix or similar such as Linux operating system may be used. These operating systems can execute one or more browsers such as a browser made by Microsoft or Google or Mozilla or other browser program that can access web applications hosted by the Internet servers over a network such as the Internet, a local intranet; or a virtual private network.

As used herein, instructions refer to computer-implemented steps for processing information in the system. Instructions can be implemented, in software, firmware or hardware; hence, illustrative components, blocks, modules, circuits, and steps are set forth in terms of their functionality.

A processor may be any conventional general purpose single- or multi-chip processor that can execute logic by means of various lines such as address lines, data lines, and control lines and registers and shift registers. Moreover, any logical blocks, modules, and circuits described herein can be implemented or performed, in addition to a general purpose processor, in or by a digital signal processor (DSP), a field programmable gate array (FPGA) or other programmable logic device such as an application specific integrated circuit (ASIC), discrete gate or transistor logic, discrete hardware components, or any combination thereof designed to perform the functions described herein. A processor can be implemented by a controller or state machine or a combination of computing devices.

Any software and/or applications described by way of flow charts and/or user interfaces herein can include various sub-routines, procedures, etc. It is to be understood that logic divulged as being executed by e.g. a module can be redistributed to other software modules and/or combined together in a single module and/or made available in a shareable library.

Logic when implemented in software, can be written in an appropriate language such as but not limited to C# or C++, and can be stored on or transmitted through a computer-readable storage medium (e.g. that may not be a transitory signal) such as a random access memory (RAM), read-only memory (ROM), electrically erasable programmable read-only memory (EEPROM), compact disk read-only memory (CD-ROM) or other optical disk storage such as digital versatile disc (DVD), magnetic disk storage or other magnetic storage devices including removable thumb drives, etc. A connection may establish a computer-readable medium. Such connections can include, as examples, hard-wired cables including fiber optics and coaxial wires and twisted pair wires, Such connections may include wireless communication connections including infrared and radio.

In an example, a processor can access information over its input lines from data storage, such as the computer readable storage medium, and/or the processor can access information wirelessly from an Internet server by activating a wireless transceiver to send and receive data. Data typically is converted from analog signals to digital by circuitry between the antenna and the registers of the processor when being received and from, digital to analog when being transmitted. The processor then processes the data through its shift registers to output calculated data on output lines, for presentation of the calculated data on the device.

Components included in one embodiment can be used in other embodiments in any appropriate combination. For example, any of the various components described herein and/or depicted in the Figures may be combined, interchanged or excluded from other embodiments.

"A system having at least one of A, B, and C" (likewise "a system having at least one of A, B, or C" and "a system having at least one of A, B, C") includes systems that have A alone, B alone, C alone, A and B together, A and C together, B and C together, and/or A, B, and C together, etc.

"A system having one or more of A, B, and C" (likewise "a system having one or more of A, B, or C" and "a system having one or more of A, B, C") includes systems that have A alone, B alone, C alone, A and B together, A and C together, B and C together, and/or A, B, and C together, etc.

The term "circuit" or "circuitry" is used in the summary, description, and/or claims. As is well known in the art, the term "circuitry" includes all levels of available integration, e.g., from discrete logic circuits to the highest level of circuit integration such as VLSI, and includes programmable logic components programmed to perform the functions of an embodiment as well as general-purpose or special-purpose processors programmed with instructions to perform those functions.

Now specifically in reference to FIG. 1, it shows an example block diagram of an information handling system and/or computer system 100. Note that in some embodiments the system 100 may be a desktop computer system, such as one of the ThinkCentre® or ThinkPad® series of personal computers sold by Lenovo (US) Inc. of Morrisville, N.C., or a workstation computer, such as the ThinkStation®, which are sold by Lenovo (US) Inc. of Morrisville, N.C.; however, as apparent from the description herein, a client device, a server or other machine in accordance with present principles may include other features or only some of the features of the system 100. Also, the system 100 may be e.g. a game console such as XBOX® or Playstation®.

As shown in FIG. 1, the system 100 includes a so-called chipset 110. A chipset refers to a group of integrated circuits, or chips, that are designed to work together. Chipsets are usually marketed as a single product (e.g., consider chipsets marketed under the brands INTEL®, AMD®, etc.).

In the example of FIG. 1, the chipset 110 has a particular architecture, which may vary to some extent depending on brand or manufacturer. The architecture of the chipset 110 includes a core and memory control group 120 and an I/O controller hub 150 that exchange information (e.g., data, signals, commands, etc.) via, for example, a direct management interface or direct media interface (DMI) 142 or a link controller 144. In the example of FIG. 1, the DMI 142 is a chip-to-chip interface (sometimes referred to as being a link between a "northbridge" and a "southbridge").

The core and memory control group 120 include one or more processors 122 (e.g., single core or multi-core, etc.) and a memory controller hub 126 that exchange information via a front side bus (FSB) 124. As described herein, various components of the core and memory control group 120 may be integrated onto a single processor die, for example, to make a chip that supplants the conventional "northbridge" style architecture.

The memory controller hub 126 interfaces with memory 140. For example, the memory controller hub 126 may provide support tor DDR SDRAM memory (e.g., DDR, DDR2, DDR3, etc.). In general, the memory 140 is a type of random-access memory (RAM), It is often referred to as "system memory."

The memory controller hub 126 further includes a low-voltage differential signaling interface (LVDS) 132. The LVDS 132 may be a so-called LVDS Display Interface (LDI) for support of a display device 192 (e.g., a CRT, a flat panel, a projector, a touch-enabled display, etc.). A block 138 includes some examples of technologies that may be supported via the LVDS interface 132 (e.g., serial digital video, HDMI/DVI, display port). The memory controller hub 126 also includes one or more PCI-express interfaces (PCI-E) 134, for example, for support of discrete graphics 136. Discrete graphics using a PCI-E interface has become an alternative approach to an accelerated graphics port (AGP). For example, the memory controller hub 126 may include a 16-lane (×16) PCI-E port for an external PCI-E-based graphics card (including e.g. one of more GPUs). An example system may include AGP or PCI-E for support of graphics.

The I/O hub controller 150 includes a variety of interfaces. The example of FIG. 1 includes a SATA interface 151, one or more PCI-E interfaces 152 (optionally one or more legacy PCI interfaces), one or more USB interfaces 153, a LAN interface 154 (more generally a network interface for communication over at least one network such as the Internet, a WAN, a LAN, etc. under direction of the processors) 122), a general purpose I/O interface (GPIO) 155, a low-pin count (LPC) interface 170, a power management interface 161, a clock generator interface 162, an audio interface 163 (e.g., for speakers 194 to output audio), a total cost of operation (TCO) interface 164, a system management bus interface (e.g., a multi-master serial computer bus interface) 165, and a serial peripheral flash memory/controller interface (SPI Flash) 166, which, in the example of FIG. 1, includes BIOS 168 and boot code 190. With respect to network connections, the I/O hub controller 150 may include integrated gigabit Ethernet controller lines multiplexed with a PCI-E interface port. Other network features may operate independent of a PCI-E interface.

The interfaces of the I/O hub controller 150 provide for communication with various devices, networks, etc. For example, the SATA interface 151 provides for reading, writing or reading and writing information on one or more drives 180 such as HDDs, SDDs or a combination thereof, but in any case the drives 180 are understood to be e.g. tangible computer readable storage mediums that may not be transitory signals. The I/O hub controller 150 may also include an advanced host controller interface (AHCI) to support one or more drives 180, The PCI-E interface 152 allows for wireless connections 182 to devices, networks, etc. The USB interface 153 provides for input devices 184 such as keyboards (KB), mice and various other devices (e.g., cameras, phones, storage, media, players, etc.).

In the example of FIG. 1, the LPC interface 170 provides for use of one or more ASICs 171, a trusted platform module (TPM) 172, a super I/O 173, a firmware hub 174, BIOS support 175 as well as various types of memory 176 such as ROM 177, Flash 178, and non-volatile RAM (NVRAM) 179. With respect to the TPM 172, this module may be in the form of a chip that can be used to authenticate software and hardware devices. For example, a TPM may be capable of performing platform authentication and may be used to verify that a system seeking access is the expected system.

The system 100, upon power on, may be configured to execute boot code 190 for the BIOS 168, as stored within the SPI Flash 166, and thereafter processes data under the control of one or more operating systems and application software (e.g., stored in system memory 140). An operating system may be stored in any of a variety of locations and accessed, for example, according to instructions of the BIOS 168.

Additionally, though now shown for clarity, in some embodiments the system 100 may include a gyroscope for e.g. sensing and/or measuring the orientation of the system 100 and providing input related thereto to the processor 122, an accelerometer for e.g. sensing acceleration and/or movement of the system 100 and providing input related thereto to the processor 122, an audio receiver/microphone providing input to the processor 122 e.g. based on a user providing audible input to the microphone, and a camera for gathering one or more images and providing input related thereto to the processor 122. The camera may be, e.g., a thermal imaging camera, a digital camera such as a webcam, and/or a camera integrated into the system 100 and controllable by the processor 122 to gather pictures/images and/or video. Still further, and also not shown for clarity, the system 100 may include a GPS transceiver that is configured to e.g. receive geographic position information from at least one satellite and provide the information to the processor 122. However, it is to be understood that another suitable position receiver other than a GPS receiver may be used in accordance with present principles to e.g. determine the location of the system 100.

Figure 2:
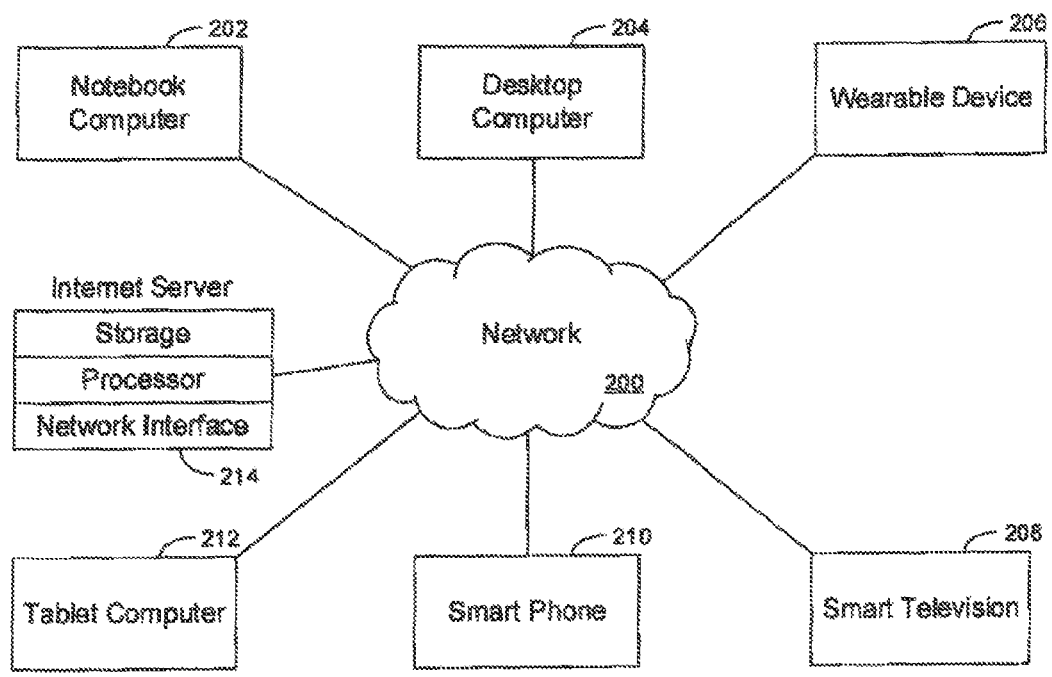
FIG. 2 is a block diagram of a network of devices in accordance with present principles.

Before moving on to FIG. 2, it is to be understood that an example client device or other machine/computer may include fewer or more features than shown on the system 100 of FIG. 1. In any case, it is to be understood at least based on the foregoing that the system 100 is configured to undertake present principles.

Turning now to FIG. 2, it shows example devices communicating over a network 200 such as e.g. the Internet in accordance with present principles, it is to be understood that e.g. each of the devices described in reference to FIG. 2 may include at least some of the features, components, and/or elements of the system 100 described above. In any case, FIG. 2 shows a notebook computer 202, a desktop computer 204, a wearable device 206 such as e.g. a smart watch, a smart television (TV) 208, a smart phone 210, a tablet computer 212, and a server 214 in accordance with present principles such as e.g. an Internet server that may e.g. provide cloud storage accessible to the devices 202-212. It is to be understood that the devices 202-214 are configured to communicate with each other over the network 200 to undertake present principles.

Figure 3:
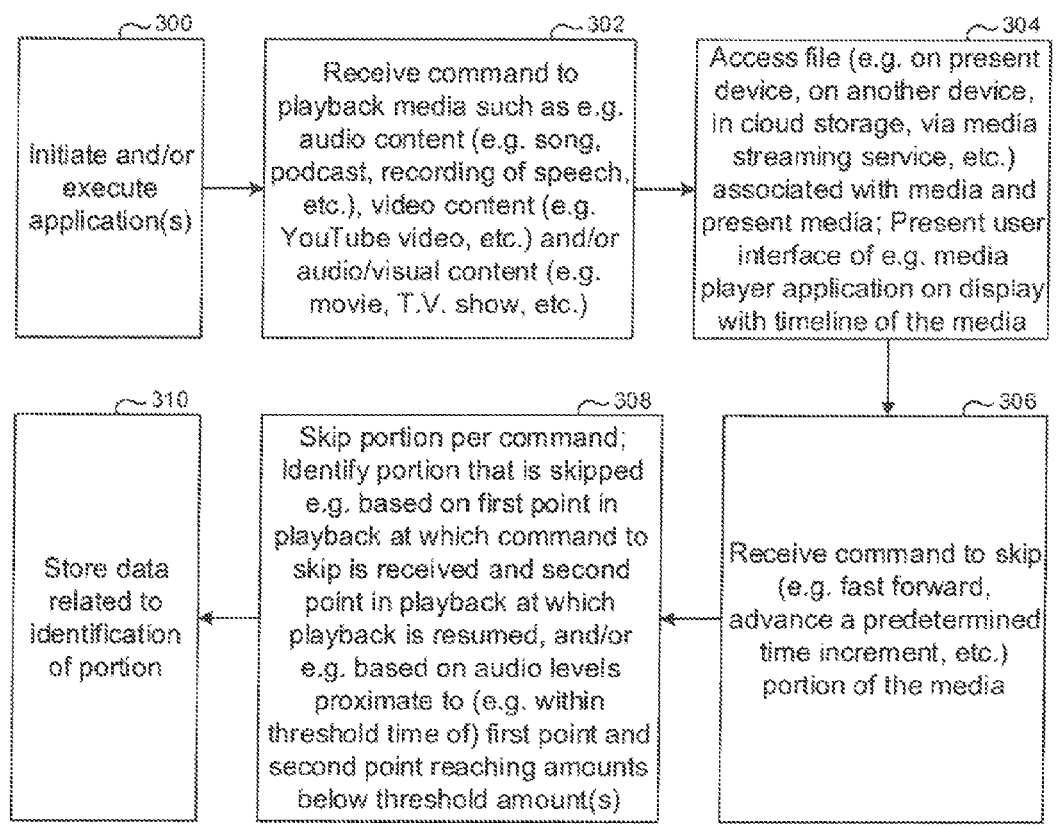
FIGS. 3 and 4 are flow charts showing example algorithms in accordance with present principles.

Referring to FIG. 3, it shows example logic that may be undertaken by a device (e.g. a music streaming server, a personal computer, a smart phone, etc.) such as the system 100 in accordance with present principles. A device undertaking the logic of FIG. 3 will be referred to below as the "present device." In any case, and beginning at block 300, the logic initiates and/or executes one or more applications for undertaking present principles, such as e.g. a music player application and/or a music streaming service application. The logic then moves to block 302 where the logic receives a command (e.g. from a user, from another device, etc.) to playback and/or present media such as e.g. audio content (e.g. a song, a podcast, a recording of speech, a combination of a song and a recording of speech, etc.), video content (e.g. a Youtube video), and/or audio video (A/V) content (e.g. a movie, a television show, etc.). Alter block 302, the logic moves to block 304.

At block 304 the logic accesses a file associated with the media (e.g. a music file comprising the media, an A/V content file comprising the media, etc.) and begins presentation and/or playback of the requested media. The file that is accessed may be e.g. stored at the present device, stored on another device, stored in cloud storage accessible to the present device, accessed via a music providing service and/or music streaming service, etc. Also at block 304, the logic may present on a display (e.g. of the present device) a user interface (UI) that is e.g. associated, with a media player application being used to playback the requested media. It is to be understood that in some embodiments, the UI may include a timeline presented thereon which represents a total period and/or total length of time for (e.g. normal and/or real time) playback of the media, and even e.g. a cursor or position indicator thereon that indicates what portion of the media is currently being presented, where the cursor or position indicator may progress along the timeline from e.g. left to right as playback of the media progresses from beginning to end.

After block 304 the logic proceeds to block 306, where the logic receives a command to skip a portion of the media being presented. Skipping may include e.g. fast forwarding through a portion of the media content, advancing a predetermined time increment in the media without playing back the portion that is advanced through (e.g. a "jump" command to skip ahead a predefined and/or user defined number of seconds), etc.

From block 306 the logic proceeds to block 308, where the logic skips a portion of the media per the command received at block 306. Also at block 308, the logic identifies the portion that is skipped. The portion that is skipped may be identified e.g. as being between a first point in playback of the media at which and/or during which a command to skip is received and a second point in playback of the media at which and/or during which playback is resumed (e.g. which may also occur based on a command, as well as e.g., based on resumption of playback after skipping forward a predetermined time increment). Note that if the command received at the first point was actually plural commands to advance plural predetermined time increments e.g. such as maybe the case if the predetermined time increment is fifteen seconds and the user wished to advance thirty seconds, the second point may be identified not as resumption of playback after a first command which only advanced fifteen seconds and resulted in a momentary playback of the media before a second command to advance another fifteen seconds is received, but may be identified as the last point that was advanced to based on the predetermined time increments if e.g. playback is allowed to continue therefrom for e.g. a predetermined and/or threshold time (e.g. two seconds, five seconds, etc.) without receiving another command to advance an additional predetermined time increment.

Still in reference to block 308, in addition to or in lieu of the foregoing, the portion that is skipped may be identified based on identification of the first point and the second point disclosed above and identification of audio levels of the media (e.g. volume and/or audio output level) at points respectively proximate to the first point and the second point reaching and/or falling below a threshold amount and/or threshold level. The portion may then be identified as being between the points at which the levels of the audio fell below the threshold amount that are respectively proximate (e.g. within a threshold and/or user-defined time and/or range) to the first point and the second point.

For instance, suppose that half way through audio being presented on the present device, the artist of a song in the audio stops singing the song, a momentary silence occurs, and then the artist speaks for a few moments before resuming playing the song again. A user may provide a command to skip e.g. one or two seconds after the artist begins speaking even though the user desires to skip the entirety of the portion in which the artist speaks (e.g. the one or two second delay between the artist speaking the receipt of the skip command being the result of the user e.g. first having to realize he or she desires to skip the speaking portion once that portion begins to be presented before providing the command). The device may identify, based on the point at which the command is received, another point proximate thereto to at least in part identify the beginning point of the portion which the user desired to skip, which in this case would be a point at which the momentary silence occurs. The portion of the media in which the artists speaks may thus be identified in part based on this beginning point as the portion to skip without user input once a threshold number of times skipped has been reached in accordance with present principles.

Still in reference to FIG. 3, note that after block 308 the logic moves to block 310. At block 310 the logic may store data related to identification of the portion, such as e.g. the first point and the second point described above, beginning and/or end points proximate thereto such as the beginning point described above, a segment of time in the audio establishing the portion and/or a particular range in the audio establishing the portion (e.g. from a first time in the audio at the beginning point of the audio to be skipped to a second time in the audio at the end point of the audio to be skipped), etc.

Figure 4:
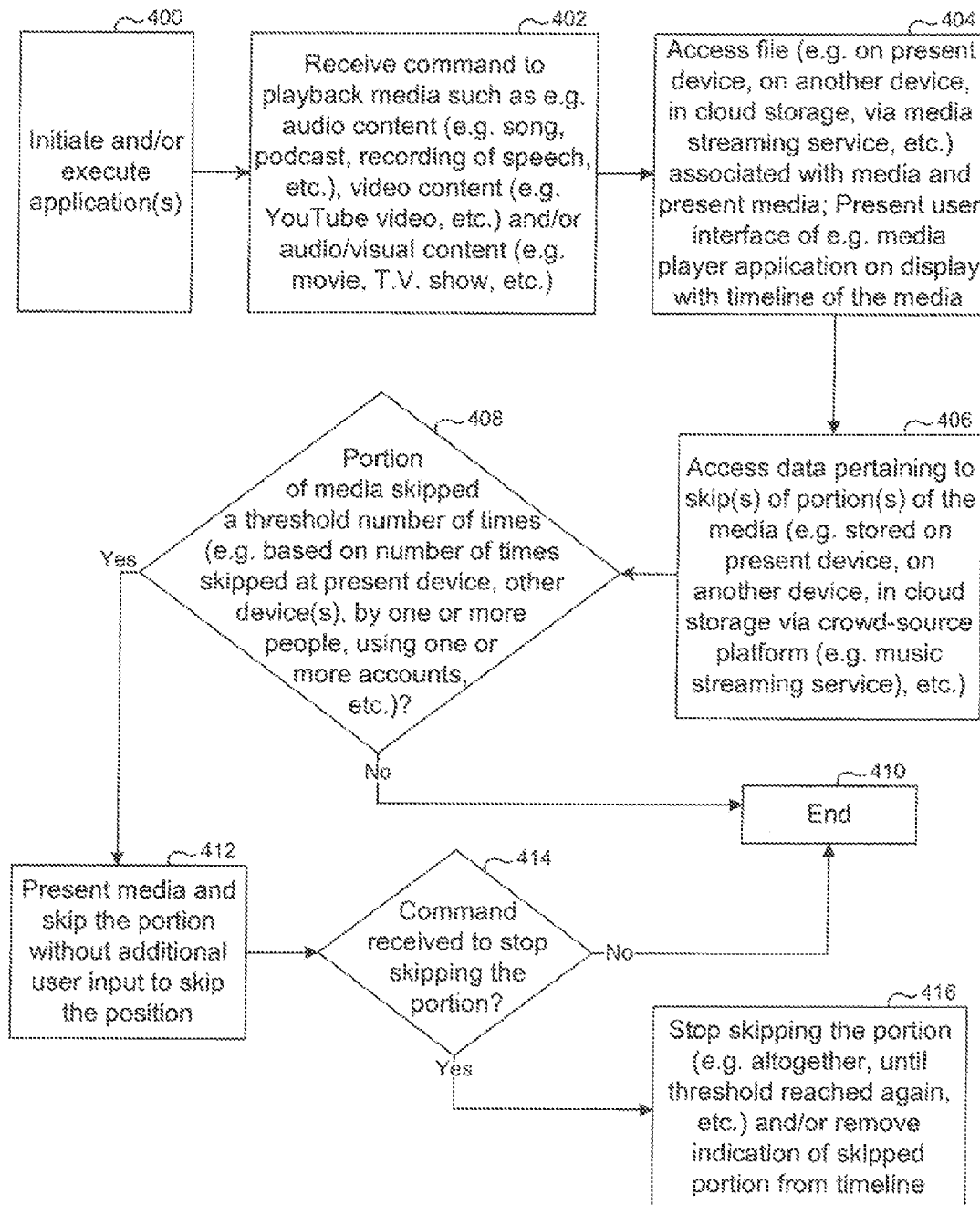

Continuing the detailed description now in reference to FIG. 4, it shows example logic that may be undertaken by a device (e.g. a server, a personal computer, a smart phone, etc.) such as the system 100 in accordance with present principles. A device undertaking the logic of FIG. 4 will be referred to below as the "present device." Furthermore, note that the logic of FIG. 4 may be undertaken (e.g. by a single device) in conjunction with the logic of FIG. 3. In any case, and beginning at block 400, the logic initiates and/or executes one or more applications for undertaking present principles, such as e.g. a music player application and/or a music streaming service application. The logic then moves to block 402 where the logic receives a command (e.g. front a user, from another device, etc.) to playback and/or present media such as e.g. audio content (e.g. a song, a podcast, a recording of speech, a combination of a song and a recording of speech, etc.), video content (e.g. a Youtube video), and/or audio video (A/V) content (e.g. a movie, a television, show, etc.). After block 402, the logic moves to block 404.

At block 404 the logic accesses a file associated with the media (e.g. a music file comprising the media, an A/V content file comprising the media, etc.) and begins presentation and/or playback of the requested media. The file that is accessed may be e.g. stored at the present device, stored on another device, stored in cloud storage accessible to the present device, accessed via a music providing service and/or music streaming service, etc. Also at block 404, the logic may present on a display (e.g. of the present device) a user interface (UI) that is e.g. associated with a media player application being used to playback the requested media. It is to be understood that in some embodiments, the UI may include a timeline presented thereon which represents a total period and/or total length of time (e.g. normal and/or real-time) for playback of the media and even e.g. a cursor or position indicator thereon that indicates what portion of the media is currently being presented, where the cursor or position indicator may progress along the timeline from e.g. left to right as playback of the media progresses from beginning to end.

After block 404 the logic proceeds to block 406, where the logic accesses data pertaining to one or more skips of one or more portions of the media, where such data may be stored e.g. at the present device, stored on another device, stored in cloud storage accessible to the present device, accessed via a data crowd-sourcing platform, accessed via a music providing service and/or music streaming service, etc. For instance, the present device may at block 406 access the data described above as being stored at block 310 of FIG. 3.

After block 408 the logic moves to decision diamond 408. At diamond 408 the logic determines whether, at least in part based on the data accessed at block 406, at least one portion of the media has been skipped (and/or passed without presenting and/or passed over) a threshold number of times. The threshold number of times may pertain to the number of times a given portion was skipped at the present device, at one or more other devices, by one or more people including the user of the present device and a user of another device, using one or more accounts which have access to the media file such as e.g. plural music streaming accounts, etc. A negative determination at diamond 408 causes the logic to move to block 410 where the logic may end and/or continue playing back the media without skipping a portion.

However, an affirmative determination at diamond 408 instead causes the logic to proceed to block 412. At block 412 the logic continues to present the media and at the appropriate time automatically without further user input skips the portion previously skipped the threshold number of times. After block 412 the logic then moves to decision diamond 414, where the logic determines whether a command (e.g. from a user, from another device) has been received to stop skipping the portion that was previously skipped the threshold number of times, A negative determination at diamond 414 causes the logic to move to block 410 as described above. However, an affirmative determination at diamond 414 instead causes the logic to move to block 416.

At block 416, the logic stops and/or prevents skipping of the portion upon subsequent playbacks of the media and/or removes any indication presented on the timeline (e.g. presented at block 404) indicating the portion to be skipped and/or that has been skipped. In some embodiments, the logic may stop and/or prevent, skipping of the portion altogether going forward (e.g. such that it is not skipped again even if the threshold number of times is again reached). For instance, if plural users of a music streaming service have skipped a certain portion of a song enough times to meet the threshold amount, the first time the song is presented on a particular user's device the portion may be skipped. The particular user may then provide a command to cause the portion to stop being skipped even if e.g. other users of the music streaming service subsequently continue to skip the portion enough times to again reach the threshold.

Notwithstanding, note that in other embodiments the logic may stop and/or prevent skipping of the portion upon subsequent playbacks of the media by e.g. resetting a counter of the skips (e.g. from which a determination as to whether the threshold amount has been reached may be made) to zero and then again skipping the portion upon subsequent playbacks of the media once the threshold amount is again reached. Regardless, it is to be understood that after block 416, the logic may proceed to block 410 as described above.

Figure 5:
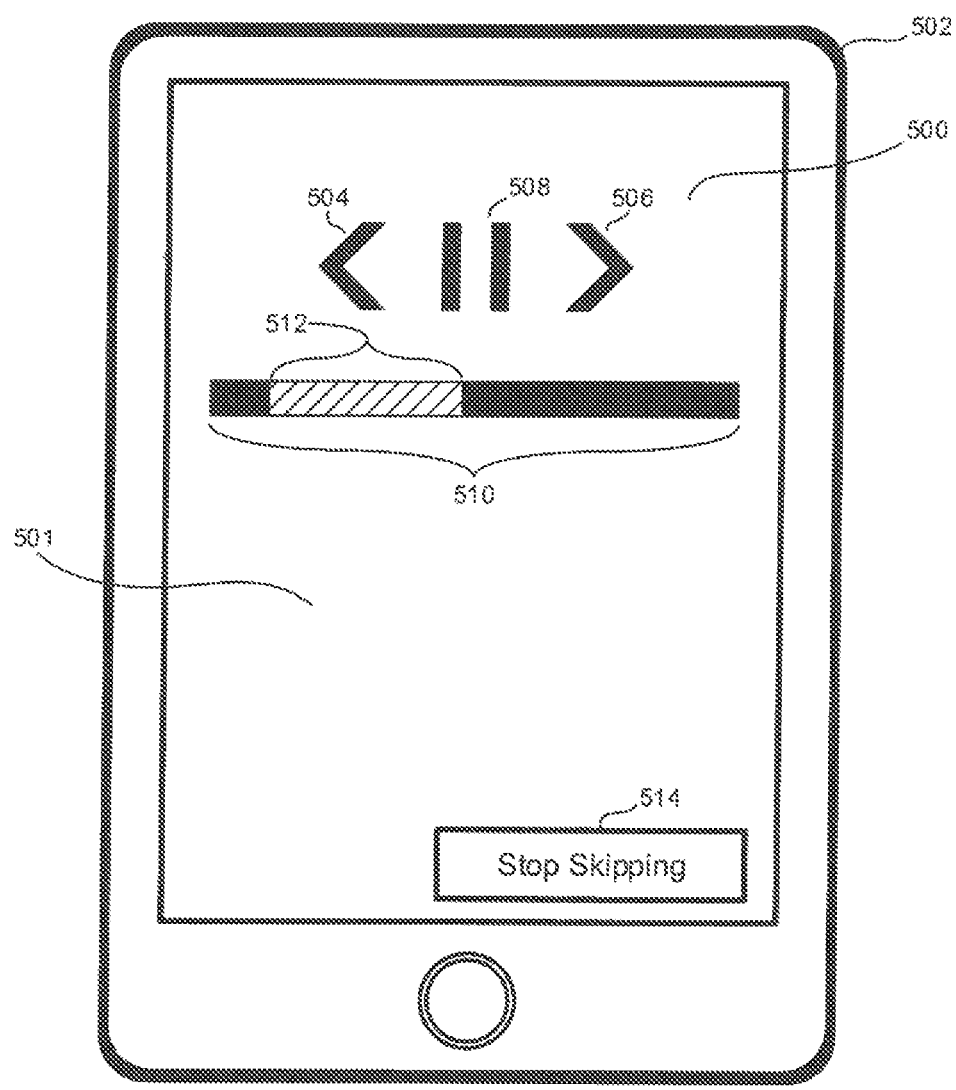
FIGS. 5-7 are example user interfaces (UIs) in accordance with present principles.

Now in reference to FIG. 5, it shows an example user interface (UI) 500 presented, on an example display 501 of an example device 502, which may be e.g. a smart phone or tablet computer. It is to be understood that the UI 500 may be associated with e.g. a music player application and/or a music streaming service application which is presenting media in accordance with present principles. The UI 500 includes a back selector element 504 which is selectable (e.g. based on touch input from a user, based on selection using a mouse, etc.) to go back to an earlier portion of the media being presented. E.g., the element 504 may be a selector element to rewind the media, a selector element to go back in the media a predetermined time increment, etc. In addition to the foregoing, the UI 500 includes a forward selector element 506 which is selectable (e.g. based on touch input from a user, based on selection using a mouse, etc.) to go forward to a later portion of the media being presented. E.g., the element 506 may be a selector element to fast forward the media, a selector element to advance in the media a predetermined time increment, etc. Still further, note that the UI 500 includes a pause selector element 508 selectable to pause presentation of the media.

Still in reference to FIG. 5, note that a timeline 510 is shown on the UI 500 which represents a (e.g. total) period of time of (e.g. normal and/or real-time speed of) playback of the media (e.g. from beginning to end). It may be appreciated from FIG. 5 that the timeline 510 includes a portion and/or indication 512 (e.g. blocked off from the rest of the timeline 510) which may be colored differently than other respective portions of the timeline 510 (e.g. presented in red rather than another color for the rest of the timeline 510 such as e.g. blue), it is to be understood that the portion and/or indication 512 corresponds to a portion (e.g. range of time) of the media that has already been skipped a threshold number of times in accordance with present principles and hence will be skipped upon subsequent playbacks of the media including the playback instance represented in FIG. 5.

It is to be further understood that the portion and/or indication 512 may also be selectable to (e.g. establishes a selector element selectable to), without further user input, remove the portion and/or indication 512 from the timeline and prevent skipping in the future of the portion skipped the threshold number of times. Note that in some embodiments, removal of the portion and/or indication 512 does not shorten the timeline 510 and/or cause the portion of the display that previously presented the portion and/or indication 512 to remain unoccupied, but instead e.g. removes the different coloring and/or selectable feature described above so that the timeline 510 has the same horizontal length on the UI but also has e.g. a unitary color and no indication of a portion to be skipped. An example of the appearance of the timeline 510 after removal of the portion and/or indication 512 (e.g. responsive to selection thereof) is shown in FIG. 6.

Again in reference to FIG. 5, in some embodiments the UI 500 may include an additional selector element which is selectable to, without further user input, remove the portion and/or indication 512 from the timeline and prevent the skipping in the future of the portion skipped the threshold number of times. Regardless, and again in reference to the portion and/or indication 512, it is to be understood that although not shown, in some embodiments the portion and/or indication 512 may include thereon a number (e.g. in parenthesis) representing the actual number of times the media has been skipped (e.g. at the present device, at any device, by the particular user of the device 502, by any user, by anyone having an account and/or profile associated with the media (e.g. a music streaming service account), etc.), and/or a number representing the threshold number of times a manual skip by a user is to occur to before the portion is skipped automatically in accordance with present principles.

Figure 6:
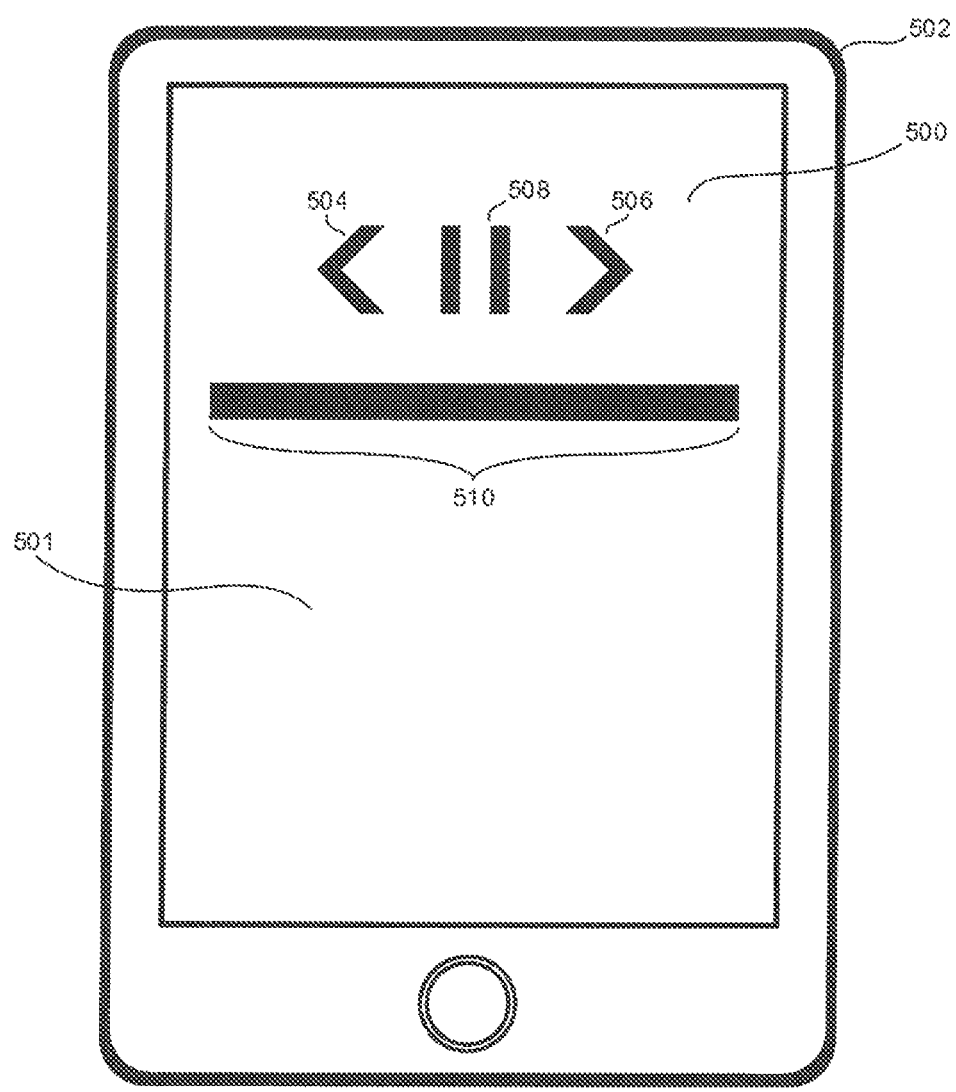

Before moving on in the detailed description, it is to be understood that the UI 500 of FIGS. 5 and 6, and indeed the timeline 510, may pertain to e.g. audio content, video content, and/or A/V content. Thus, though not shown for clarity, in addition to the device 502 presenting audio of the media over a speaker, the display 501 may present video of the media as well.

Figure 7:
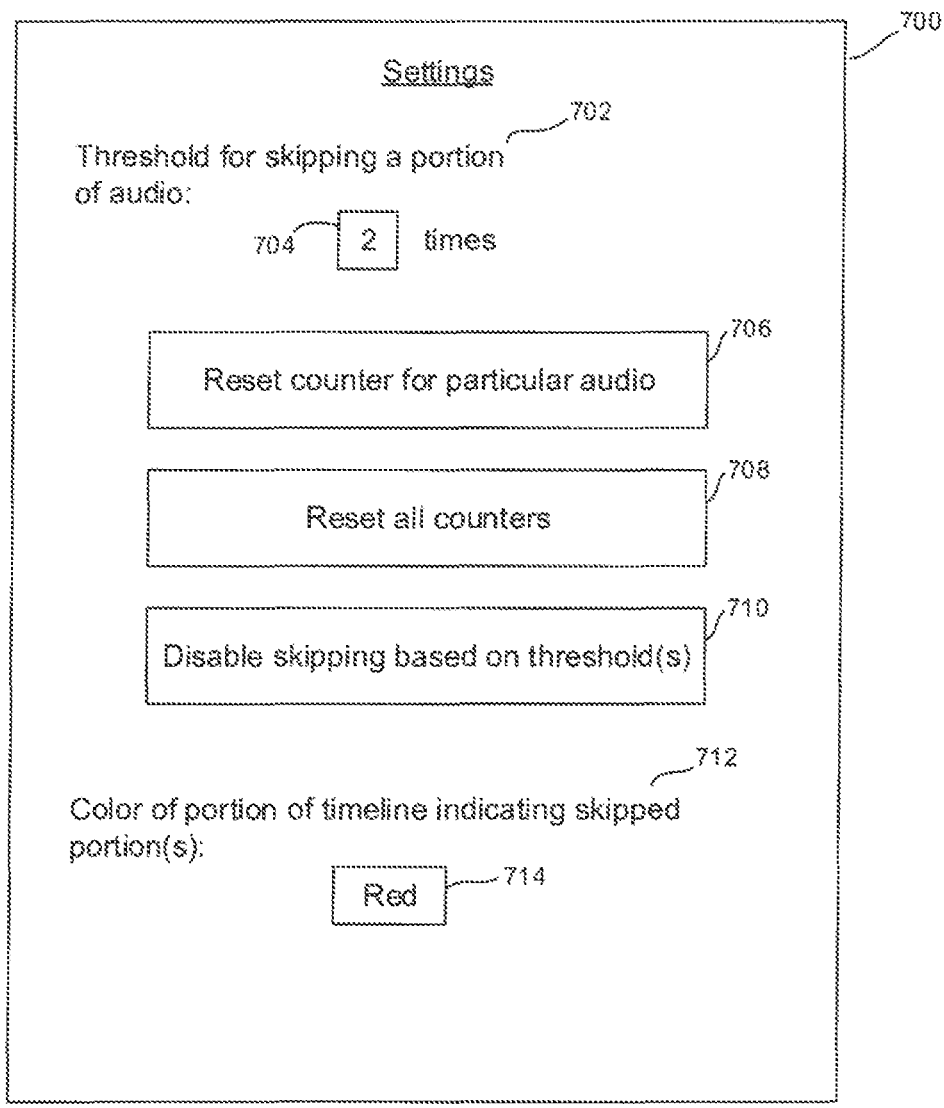

Continuing the detailed description in reference to FIG. 7, it shows an example user interface (UI) 700 presentable a device such as the system 100 in accordance with present principles. The UI 700 may be for configuring one or more settings of an application and/or device undertaking present principles. Accordingly, a setting 702 is shown on the UI 700 which pertains to a user-definable threshold number of times (and/or threshold percentage of times) that a portion of media is to be skipped in order to configure the device to subsequently do so automatically in accordance with present principles. Thus, the setting 702 includes a number entry box 704 at which a user may enter a number to establish the threshold number.

The UI 700 also includes a selector element 706 selectable to automatically without further user input reset to zero an electronic (e.g. software) counter of skips of a particular piece of media, where that counter may be used by a device to make a determination as to whether a threshold amount of times a portion has been skipped has been reached in accordance with present principles. Also shown on the UI 700 is a selector element 708 selectable to automatically without further user input reset to zero art electronic (e.g. software) counter of skips of all pieces of media (e.g. accessible using the device presenting the UI 700). Even further, the UI 700 may include a selector element 710 selectable to automatically without further user input disable and/or prevent the skipping of any portions of media based on a threshold amount of skips (e.g. prevent the skipping at the present device only, prevent the skipping at any device associated with a single music streaming account (e.g. associated with a particular user) and/or any device associated with the particular user himself or herself (e.g. all devices for a user linked via cloud storage in which the media is stored), etc.).

Still in reference to FIG. 7, the example UI 700 also includes a setting 712 which pertains to a user-definable color for a portion of a timeline that has been skipped a threshold number of times in accordance with present principles, such as the portion and/or indication 512 described above, A color entry box 714 is shown at which a user may enter (e.g. type) and/or select a color for presentation of such a portion. Thus, it is to be understood that in some embodiments, selection of the box 714 may automatically without further user input cause a drop-down menu including selector elements respectively associated with various colors to be presented from which a user may select a color by selecting one of the selector elements. Responsive to selection of one of those elements, the drop-down menu may be removed from the display and the color associated with the selected selector element may automatically without further user input appear in the box 714 (e.g. in addition to selection of a selector element from the drop-down list configuring the device to present a portion of a timeline in that color).

Without reference to any particular figure, it is to be understood that identifying a portion that is skipped (e.g. such as may occur at block 308 as described above) may, in addition to or in lieu of other ways described herein, also be done by e.g. respectively averaging beginning and end points of plural skips to thus identify the beginning and end points to automatically skip upon subsequent playbacks in accordance with present principles. For instance, the beginning and end points of plural skips from a particular user and/or at a particular device may be used, but also in some embodiments the beginning and end points of plural skips from plural users e.g. streaming a particular piece of media using a media streaming service may be used.

Also without reference to any particular figure, it is to be understood that a counter such as the ones described above may, in addition to or in lieu of the ways described above, be reset to zero based on manipulation of a selector element for resetting the counter to zero presented on a file properties page and/or UI for a file associated with a particular piece of media.

Also without reference to any particular figure, it is to be understood that portions that may be skipped by a user may include, as examples, portions of live music albums having applause breaks or dead air, portions of songs or AV content establishing extended introductions (e.g., the introduction Michael Jackson's "Thriller" song and/or music video), portions of rap songs comprised of spoken skits that might not be as entertaining on repeat plays, portions of songs that have boring and/or drawn out endings, etc.

It may now be appreciated that present principles provide for e.g. each time a user skips ahead in a song, having a media player record and/or store data pertaining to the segment that is skipped. Once a certain threshold of skips are reached (e.g. such as a number of times a segment is skipped divided by number of total plays), the segment is then "blocked out." From then on, the song may fade out at the start of this unwanted segment, and then immediately fade in at the end of the segment and/or at the beginning of another segment that follows. This block off may also be indicated on the track's timeline that is presented on a display, and can be removed if a user clicks and/or touches it. Additionally, to help identify the segments or the portions the user doesn't care for, the media player may access the file itself and parse it to identify clear breaks and/or changes in the sound output to help determine beginnings and ends of such segments.

Further, it is to also be appreciated based on present principles that there may be instances where a user wishes to listen to a portion of a song that would otherwise be skipped based on the threshold of skips being reached. Thus, in some embodiments a selector element may be presented on a UI (such as the one of the UIs described above) which, responsive to selection by a user, causes the device to present what would otherwise be a skipped portion (e.g. without resetting the counter for the threshold number of skips to zero).

Even further, a device in accordance with present principles may also be configured to present yet another selector element on a UI that is selectable to without further user input skip a portion to which a threshold skips pertains e.g. on a per-playback basis rather than automatically (e.g. if the user configured the device to not skip a portion automatically even if skipped the threshold number of times). For example, such as selector element may be presented on a UI during a subsequent playback of a file e.g. responsive to the threshold number of skips being reached.

Providing another example, suppose a user is listening to a live album where the artist spends a while talking at the beginning of a track before the song itself begins. The user listens to the track ten times, and fast forwards through the opening segment five times. The media players "automatic skip" threshold is set to fifty percent, so upon reaching fifty percent the media player blocks out the opening segment of this song so that on the next play, the artist's introduction fades out (and/or is not presented at all) and the start of the song fades in. Then, if the user ever wishes to unblock that portion of the song from being skipped, they could touch and/or click the indication of this segment on the track's timeline and the skip recording and/or counter for that track would be reset (e.g. to zero).

Providing but one more example (e.g. for cloud-integrated media players), skip preferences may be pulled and/or determined from other users besides a given user of a media player and/or media streaming service. E.g., suppose a user skips the introduction to Michael Jackson's "Thriller" once. The media player recognizes that thirty percent of all media streaming users (e.g. of a particular service or of all services providing the media) also skip the introduction (e.g. thirty percent thus being the threshold in this case), indicating that it is not unusual to skip the intro. Therefore, the media player upon a subsequent playback of "Thriller" would not require the user to manually skip ahead, but instead would automatically skip the introduction based on the community's (e.g. the other users) skipping habits. Furthermore, such a media player could be configured to match the user's skipping preferences with other users with similar taste (e.g. similar taste in music such as identifying a group of users as having an interest in a particular genre), which the media player may then factor into future skipping determinations by the media player (e.g. skipping a particular portion of a song for all users who have a predominant interest in a particular genre, such as the genre of the song or a different genre).

Before concluding, it is to be understood that although e.g. a software application for undertaking present principles may be vended with a device such as the system 100, present principles apply in instances where such an application is e.g. downloaded from a server to a device over a network such as the Internet. Furthermore, present principles apply in instances where e.g. such an application is included on a computer readable storage medium, that is being vended and/or provided, where the computer readable storage medium is not a transitory signal and/or a signal per se.

While the particular SKIP OF A PORTION OF AUDIO is herein shown and described in detail, it is to be understood that the subject matter which is encompassed by the present application is limited only by the claims.

What is claimed is:

1. A first device, comprising:
 a processor; and
 storage accessible to the processor and bearing instructions executable by the processor to:
 determine that a portion of audio has been skipped a threshold number of times;
 in response to the determination that the portion of the audio has been skipped the threshold number of times, skip the portion without input from a user to skip the portion upon a subsequent presentation of the audio; and
 present a user interface (UI) associated with a media player application on the display, the UI comprising a timeline of the audio, the timeline of the audio comprising an indication of the portion skipped the threshold number of times.

2. The first device of claim 1, wherein the threshold number of times is more than one time.

3. The first device of claim 1, wherein the determination that the portion of the audio has been skipped the threshold number of times is based at least in part on a number of times that the portion of the audio has been skipped at at least one other device different from the first device.

4. The first device of claim 1, wherein the determination that the portion of the audio has been skipped the threshold number of times is based at least in part on a number of times that the portion of the audio has been skipped at the first device.

5. The first device of claim 1, wherein the determination that the portion of the audio has been skipped the threshold number of times is based at least in part on a number of times that the portion of the audio has been skipped by plural people.

6. The first device of claim 1, wherein the determination that the portion of the audio has been skipped the threshold number of times is based at least in part on a number of times that the portion of the audio has been skipped using plural accounts associated with the audio.

7. The first device of claim 6, wherein the plural accounts are associated with an audio streaming service, and wherein the plural accounts are associated with the audio at least in part based on the audio being accessible using the plural accounts.

8. The first device of claim 1, wherein the portion is a first portion, and wherein the audio comprises a second portion different from the first portion.

9. The first device of claim 1, wherein the audio is associated with a file stored on the first device.

10. The first device of claim 1, wherein the audio is selected from the group consisting of: a song, a podcast, a recording of speech, a combination of a song and a recording of speech.

11. The first device of claim 1, wherein the determination that the portion of the audio has been skipped the threshold number of times is based at least in part on identification of the portion, the identification of the portion being based at least in part on at least a first instance of identification of a first point in a single playback of the audio at which a first command to skip is received and of identification of a second point in the single playback of the audio at which a part of the audio is presented subsequent to receipt of the first command.

12. The first device of claim 11, wherein the portion is identified at least in part based on the first instance and identification of audio levels of the audio at third and fourth points at least respectively proximate to the first point and the second point reaching respective amounts one of at and below a threshold amount.

13. The first device of claim 1, wherein the indication is selectable to, without further user input, remove the indication from the timeline and prevent the device from skipping the portion.

14. A method, comprising:
  determining that a portion of a media file has been skipped a threshold number of times upon respective playbacks of the media file;
  in response to determining that the portion of the media file has been skipped the threshold number of times, skipping playback of the portion upon a subsequent playback of the media file;
  presenting on a display a timeline representing a period of time for playback of the media file; and
  presenting an indication on the timeline of the portion of the media file that has been skipped the threshold number of times.

15. The method of claim 14, wherein the media file comprises one or more of: audio content, video content, and audio video (AV) content.

16. The method of claim 14, wherein the skipping is selected from the group consisting of: fast forwarding, advancing a predetermined time increment.

17. The method of claim 14, comprising:
  presenting a selector element on the display which when selected and without further user input removes the indication from the timeline and stops the skipping of the portion upon a subsequent playback of the media file.

18. An apparatus, comprising:
  a first processor;
  a network adapter; and
  storage bearing instructions executable by a second processor of a device for:
  determining that a portion of an audio file has been skipped a threshold number of times during respective playbacks of the audio file;
  in response to the determination that the portion of the audio file has been skipped the threshold number of times, skipping playback of the portion during a subsequent playback of the audio file;
  presenting, on a display accessible to the second processor, a timeline representing a period of time of playback of the audio file; and
  blocking off on the timeline the portion of the audio file that has been skipped the threshold number of times;
  wherein the first processor transfers the instructions to the device over a network and via the network adapter.

19. The apparatus of claim 18, wherein the instructions are executable by the second processor for:
  presenting a selector element on the display which when selected stops the second processor from skipping playback of the portion upon a subsequent playback of the audio file.

20. The first device of claim 1, wherein the instructions are executable by the processor to:
  present, on the UI, a selector element that is selectable to present the portion of the audio without resetting a counter for the threshold number of times.

* * * * *